J. A. DYBLIE.
METHOD AND APPARATUS FOR TEMPERING METALS.
APPLICATION FILED SEPT. 21, 1914.
1,151,675.
Patented Aug. 31, 1915.
4 SHEETS—SHEET 1.
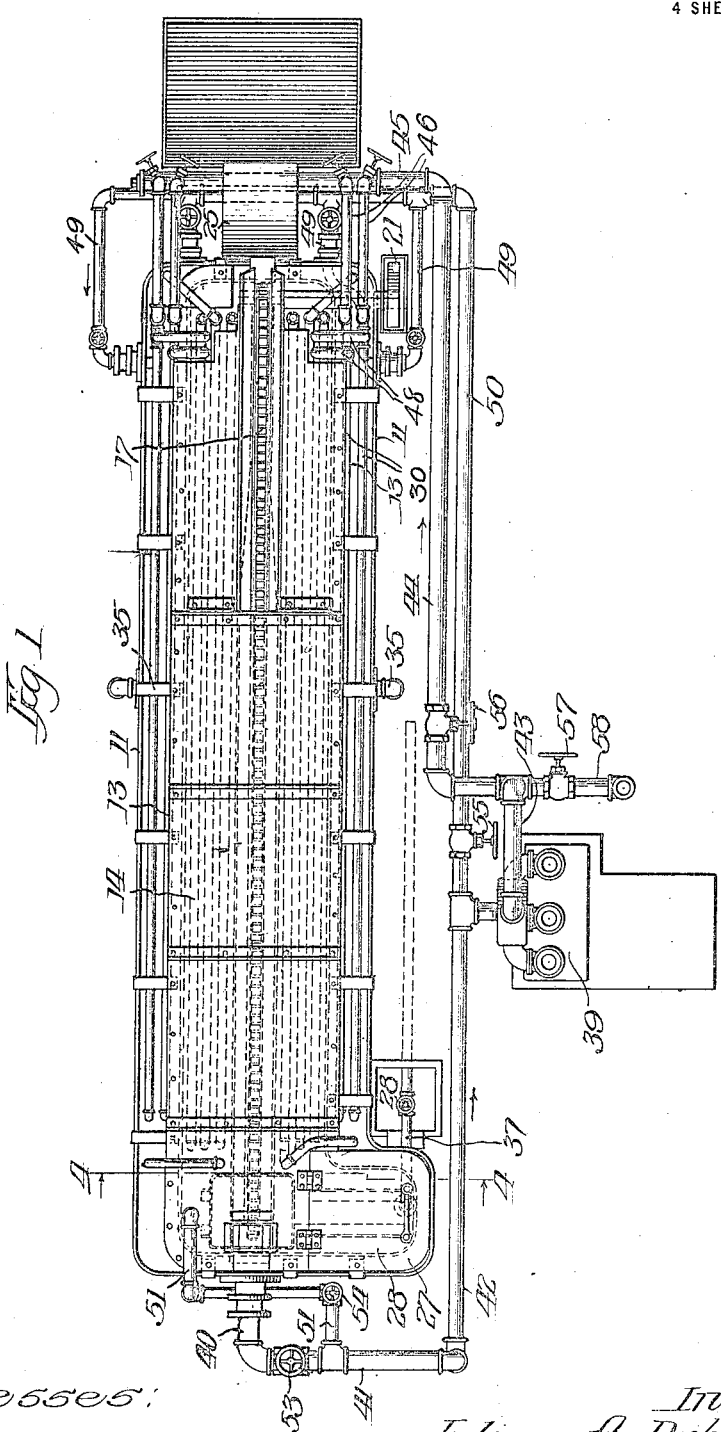

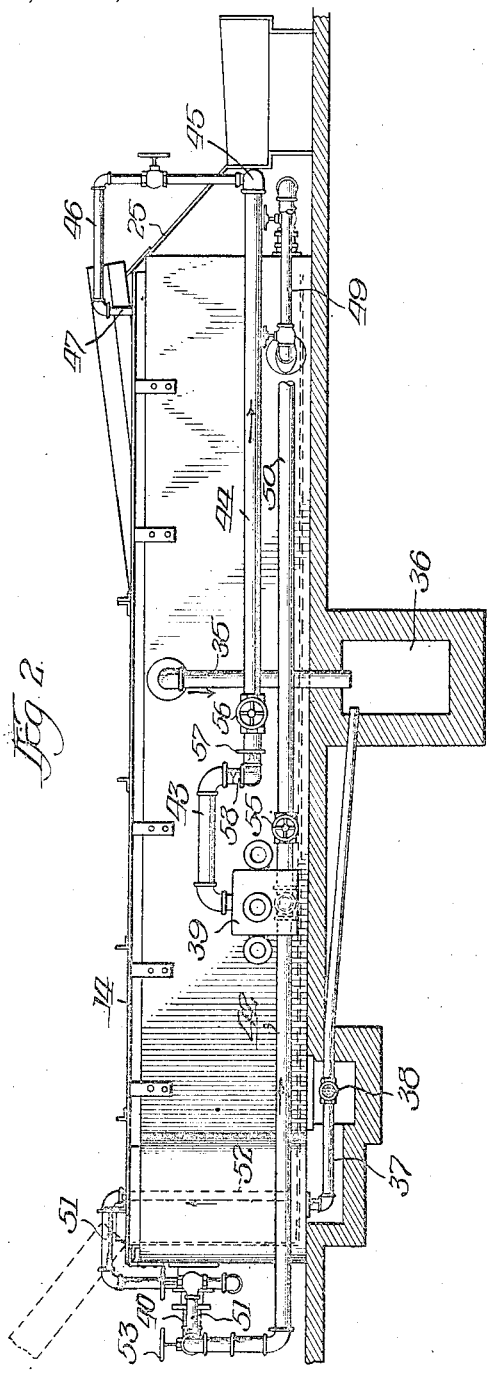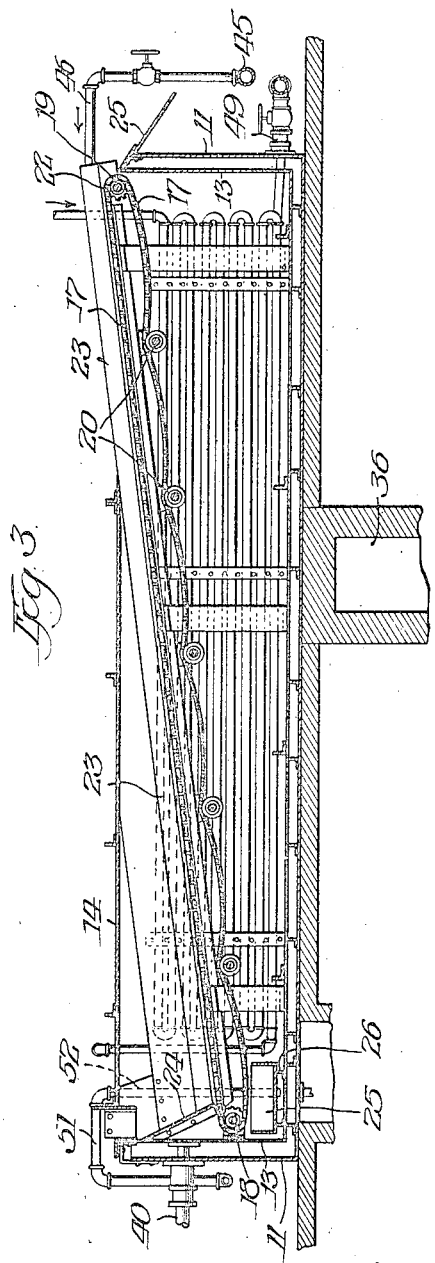

J. A. DYBLIE.
METHOD AND APPARATUS FOR TEMPERING METALS
APPLICATION FILED SEPT. 21, 1914.
1,151,675.
Patented Aug. 31, 1915.
4 SHEETS—SHEET 3.
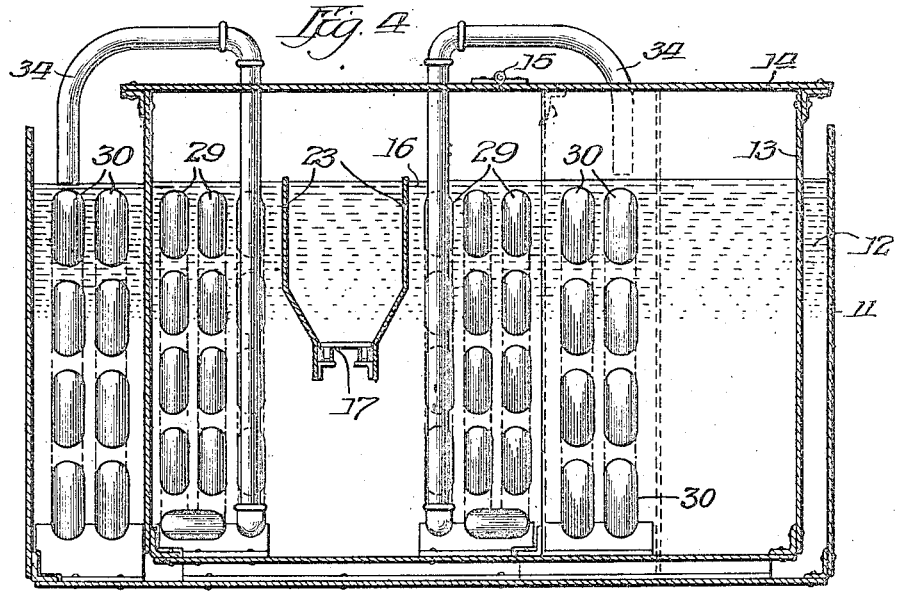
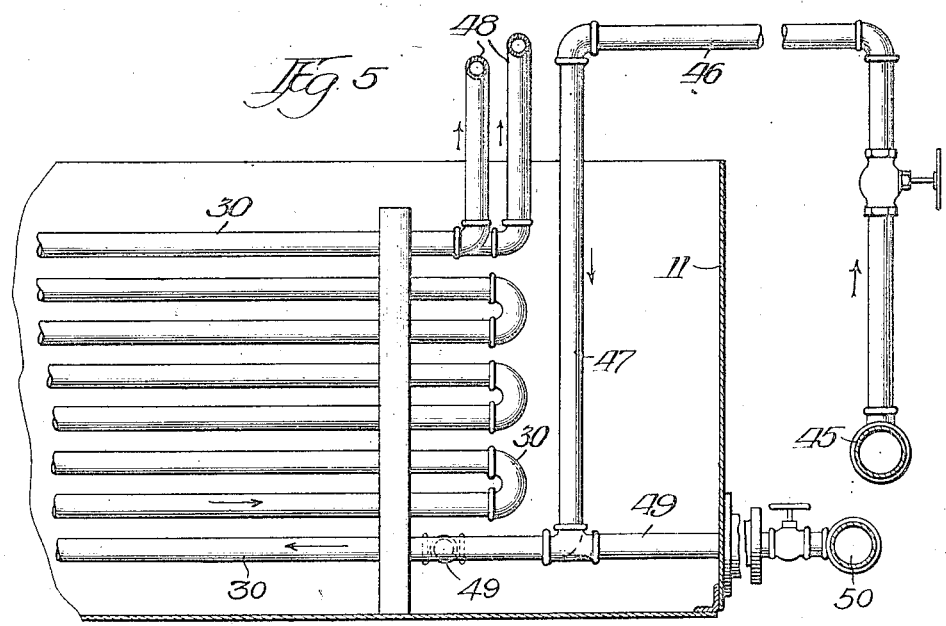

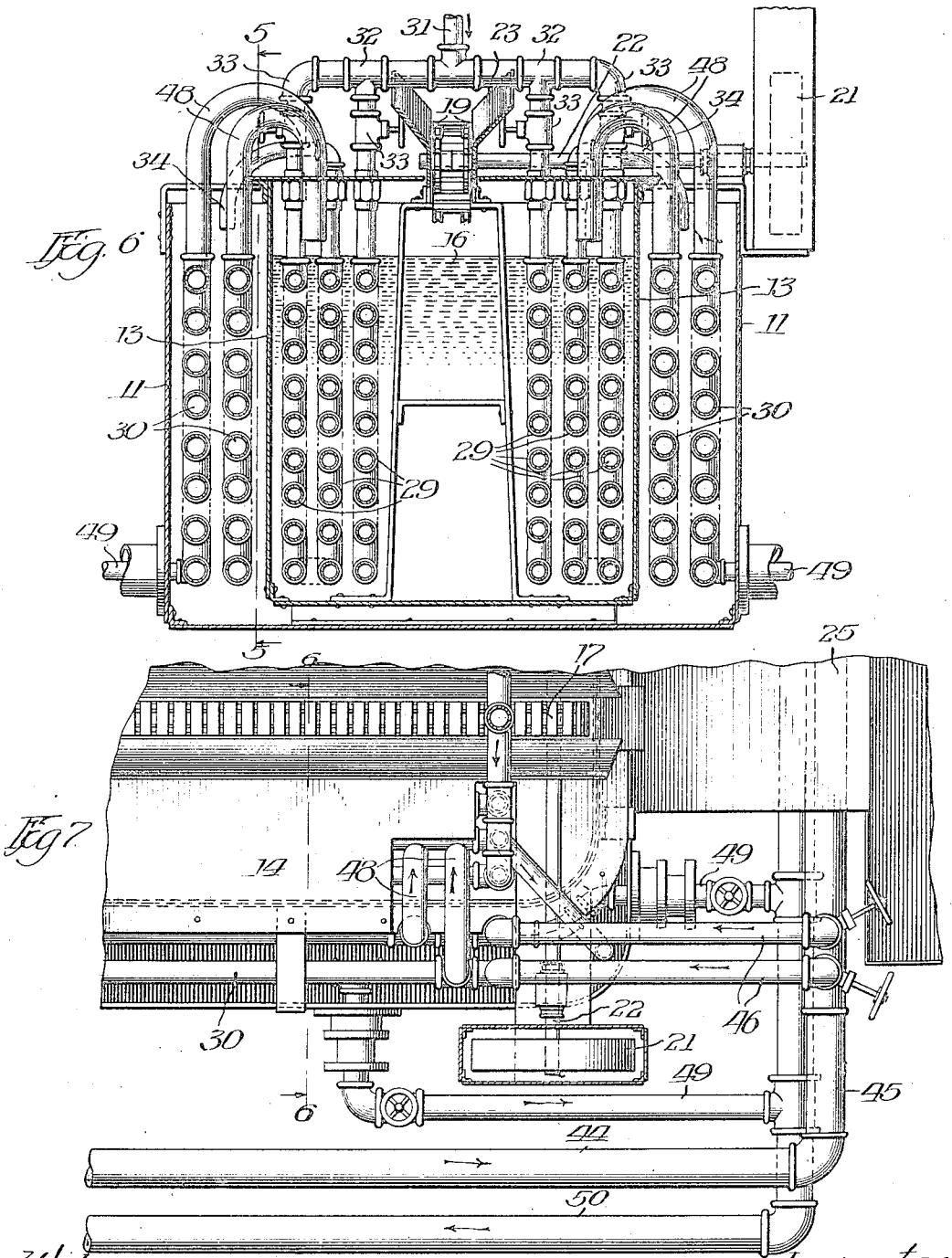

UNITED STATES PATENT OFFICE.

JULIUS A. DYBLIE, OF JOLIET, ILLINOIS.

METHOD AND APPARATUS FOR TEMPERING METALS.

1,151,675.

Specification of Letters Patent. Patented Aug. 31, 1915.

Application filed September 21, 1914. Serial No. 862,770.

*To all whom it may concern:*

Be it known that I, JULIUS A. DYBLIE, a citizen of the United States, residing at Joliet, in the county of Will and State of Illinois, have invented certain new and useful Improvements in Methods and Apparatus for Tempering Metals, of which the following is a specification.

In the oil-tempering of metals a serious difficulty encountered is that of maintaining the oil at a temperature substantially uniform and sufficiently low to produce the best results. In the effort to secure these conditions of temperature it has been usual to employ a large body of oil and also to circulate cooling water through the oil. The employment of a body of oil sufficiently large as not to be quickly raised to a high temperature is expensive from the standpoint of cost and space required and it has not been found possible to maintain a small body of oil at a substantially low uniform temperature by the circulating of cooling water therethrough.

According to my invention I not only provide for the circulation of cooling water through the oil, but I also surround the body of oil at the sides and beneath by a body of water, and I furthermore cause the heated oil to circulate through the body of water which surrounds the body of oil and am thus enabled to employ in the tempering operation a relatively small body of oil while maintaining the same at a substantially uniform temperature most efficient for the purpose in hand.

In order that the invention may be readily understood and put into operation by those skilled in the art a preferred embodiment of the same is set forth in the accompanying drawings and in the detailed description based thereon.

As, however, the invention is capable of embodiment in other and varied constructional forms and of modification of certain details in the manner of performance without departure from the essence thereof or material sacrifice of its advantages it is understood that the drawings and description are to be taken in an illustrative and not in an unnecessarily limiting sense.

In the drawings—Figure 1 is a top plan view of a preferred construction for carry- ing out the invention: Fig. 2 is a side elevation of the same; Fig. 3 is a medial longitudinal section through the same; Fig. 4 is a transverse section on the line 4—4 of Fig. 1; Fig. 5 is a fragmentary longitudinal section on the line 5—5 of Fig. 6; Fig. 6 is a transverse sectional view on the line 6—6 of Fig. 7; and Fig. 7 is a fragmentary top plan view on an enlarged scale.

As herein illustrated an outer tank 11 is provided for the reception of a body of water 12 and within the outer tank 11 is disposed an inner tank 13 spaced therefrom at the sides and bottom so as to be entirely surrounded by the body of water 12. The tank 13 has a cover 14 advantageously hinged at 15 and is arranged to contain a body of oil 16. An endless conveyer 17 for the articles to be tempered travels upon the sprockets 18 and 19 the slack return portion of the conveyer being supported by idlers 20. By means of a drive pulley 21 fixed upon the shaft 22 of the sprocket 19 the conveyer is caused to travel through the body of oil 16 between the trough-shaped guiding walls 23. The sprockets 18 and 19 are arranged in the opposite ends of the oil tank and at different elevations, the sprocket 18 being disposed in the lower portion of the tank and the sprocket 19 in the upper portion whereby the conveyer is arranged at an inclination to the horizontal. The articles to be tempered are introduced by means of a chute 24 to the lower end of the conveyer and discharged over an apron 25 at the upper end of the conveyer. In the bottom of the oil tank beneath the lower end of the conveyer at the point where the articles are introduced is arranged a pan 25 mounted to slide upon a track 26 in order to move the same laterally from beneath the conveyer into a lateral extension of the inner tank at 27 which lateral extension is covered by a hinged door 28 to enable the pan to be removed and emptied of the scale which collects therein.

Within the oil tank 14 and submerged in the body of oil 16 is arranged a series of water coils 29 and exterior to the oil tank and submerged within the body of water 12 in the outer tank 11 is arranged a series of oil circulating coils 30.

A constant supply of cooling water is introduced at 31 from a suitable source of pressure to a header 32 whence it passes through the pipes 33 to the water coils 29 and is caused to circulate through the body of oil 16 within the tank 14 and is then discharged from the coils through the pipes 34 into the body of water in the outer tank 11 adjacent that end of the tank whence the tempered articles are discharged. Overflow pipes 35 are provided for the waste of the water into a sewer or the like indicated at 36 whereby a constant flow of water through the oil-submerged coils and through the outer tank surrounding the body of oil is maintained. A water drain pipe 37 is also provided likewise leading from the lowest point of the water tank to the sewer 36 whereby when the valve 38 is opened the water may be entirely drained from the tank and coils.

Provision is made for the circulation of the oil in the inner tank and also through the water-submerged coils 30 in the outer tank in the following manner: An oil pump is indicated at 39 by means of which the oil is drawn through the pipes 40, 41 and 42 from that end of the oil tank adjacent the point where the articles to be tempered are introduced, the said oil being discharged from the pump through the pipes 43, 44, 45, 46 and 47 to the water-submerged coils 30 and after circulation through said coils 30 is discharged through the pipes 48 into the body of oil in the inner tank at that end adjacent the point of discharge of the tempered articles. The cool oil discharged into the oil tank settles to the bottom and gradually rises to the top as it becomes heated and as the more highly heated oil is withdrawn through the pipe 40 by the action of the pump. In order that as occasion requires the oil may be entirely drained from the tank and coils, suitably valved drain pipes 49, 50 and 51 are provided the pipes 49 leading from the lower portion of the coils and the pipe 51 leading from the lower portion of the inner tank by means of the vertical pipe 52. The pipes are provided with suitable valves 53, 54, 55, 56 and 57 whereby the pump may be utilized to create suction not only through the pipes 40, 41 and 42, but also through the drain pipes 50 and 51 and instead of discharging through the pipes 44 and 45 the discharge would be through the pipe 58 into a suitable storage tank.

It will thus be seen that not only is the body of oil cooled by the circulation of cooling water through said body of oil, but also by the surrounding body of water and in addition the tempering oil is maintained in circulation within its tank and is also caused to flow through pipes submerged in the body of water whereby an exceedingly efficient cooling of the oil is effected and it is thus rendered possible to employ a small body of oil and yet maintain the same at a substantially uniform low temperature.

I claim:

1. In apparatus for oil-tempering, the combination of inner and outer tanks, the inner containing oil in bulk and the outer containing water in bulk, and means to circulate the oil through the body of water, said means comprising coils of pipes in the water tank, and means to force the oil from the oil tank through said coils and back into the body of oil.

2. In apparatus for oil-tempering, the combination of inner and outer tanks, the inner containing oil in bulk and the outer containing water in bulk, and means to circulate the water through the body of oil and the oil through the body of water, said means comprising coils of water pipes in the oil tank and coils of oil pipes in the water tank, and a pump drawing its supply from the oil tank and discharging through the oil pipes into the body of oil in the tank.

3. In apparatus for oil-tempering, the combination of inner and outer tanks, the inner containing oil in bulk and the outer containing water in bulk, and means to circulate the water through the body of oil and oil through the body of water, the water pipes leading from a source of suitable supply through the oil tank and discharging into the water tank, and the oil pipes leading from the oil tank through the water tank and discharging again into the oil tank, and a pump interposed in said oil pipe system.

4. In apparatus for oil-tempering, the combination of inner and outer tanks, the inner containing oil in bulk and the outer containing water in bulk, and means to circulate the oil through the body of water, said means comprising coils of pipes located in the water tank, and a pump arranged to withdraw the oil from the hotter portion of the oil tank and force the same through the coils of water-submerged pipes and to discharge the oil into the cooler portion of the oil tank.

5. In apparatus for oil-tempering, the combination of inner and outer tanks, the inner containing oil in bulk and the outer containing water in bulk, the inner tank being supported above the floor of the outer tank to permit the water to surround the inner tank at the sides and bottom, and means to circulate the water through the body of oil and the oil through the body of water.

6. In the oil-tempering of metals, the method of controlling the temperature of the oil which consists in surrounding the body of oil with a body of water and circulating the water through the body of oil and circulating the oil through the body of water, the circulating oil being drawn from the hottest portion of the body of oil and the circulating water being introduced to the body of oil at the coolest portion thereof.

In witness whereof I have hereunto signed my name in the presence of two subscribing witnesses.

JULIUS A. DYBLIE.

Witnesses:
LEWIS T. GREIST,
CHAS. J. MURRAY.

Copies of this patent may be obtained for five cents each, by addressing the "Commissioner of Patents, Washington, D. C."